United States Patent
Ali et al.

(10) Patent No.: US 12,293,393 B2
(45) Date of Patent: May 6, 2025

(54) PREDICTIVE SERVICE ORCHESTRATION USING THREAT MODELING ANALYTICS

(71) Applicant: International Business Machines Corporation, Armonk, NY (US)

(72) Inventors: Asmahan Ali, Poughkeepsie, NY (US); Mustafa Mah, Poughkeepsie, NY (US); Abhishek Jain, Baraut (IN); Sasikanth Eda, Vijayawada (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/664,718

(22) Filed: May 24, 2022

(65) Prior Publication Data

US 2023/0385889 A1 Nov. 30, 2023

(51) Int. Cl.
*G06Q 30/0601* (2023.01)

(52) U.S. Cl.
CPC .................. *G06Q 30/0609* (2013.01)

(58) Field of Classification Search
CPC ............... G06Q 30/06–0645; G16Y 10/00–90
See application file for complete search history.

(56) References Cited

U.S. PATENT DOCUMENTS

| | | | | |
|---|---|---|---|---|
| 10,009,234 | B2 * | 6/2018 | Blondeau | H04L 41/5077 |
| 10,091,231 | B1 * | 10/2018 | Gates | H04L 63/1425 |
| 10,348,759 | B2 * | 7/2019 | Sultan | H04L 63/1433 |
| 10,693,898 | B2 | 6/2020 | Iliofotou et al. | |
| 10,771,486 | B2 | 9/2020 | Murphey et al. | |
| 10,771,493 | B2 | 9/2020 | Spisak et al. | |
| 11,184,385 | B2 * | 11/2021 | Hadar | G06F 21/577 |
| 11,240,271 | B2 * | 2/2022 | Wiener | H04W 4/60 |
| 12,047,397 | B2 * | 7/2024 | Subramanya | H04L 63/1416 |

(Continued)

FOREIGN PATENT DOCUMENTS

| | | | | | |
|---|---|---|---|---|---|
| AU | 2015203086 | B2 * | 1/2017 | ......... | H04L 63/1408 |
| GB | 2618884 | A * | 11/2023 | ........... | G06F 21/125 |

(Continued)

OTHER PUBLICATIONS

Scandariato, R., Wuyts, K. & Joosen, W. A descriptive study of Microsoft's threat modeling technique. Requirements Eng 20, 163-180 (2015). https://doi.org/10.1007/s00766-013-0195-2 (Year: 2013).*

(Continued)

*Primary Examiner* — Adam L Levine
(74) *Attorney, Agent, or Firm* — Zilka-Kotab, P.C.

(57) ABSTRACT

Provided is a computer-implemented method, system, and computer program product for predictive service orchestration using threat modeling analytics. A processor may identify a plurality of attributes of a client computing environment. The processor may collect threat modeling content for a plurality of vendor computing environments. The processor may analyze the threat modeling content for the plurality of vendor computing environments. The processor may compare the analyzed threat modeling content for the plurality of vendor computing environments with the plurality of attributes of the client computing environment. The processor may generate, based on the comparing, a client threat model for the client computing environment.

15 Claims, 8 Drawing Sheets

(56) References Cited

U.S. PATENT DOCUMENTS

| | | | |
|---|---|---|---|
| 2009/0077666 A1* | 3/2009 | Chen | G06F 21/577 726/25 |
| 2012/0304300 A1 | 11/2012 | LaBumbard | |
| 2017/0017795 A1* | 1/2017 | DiGiambattista | G06F 21/577 |
| 2018/0205755 A1 | 7/2018 | Kavi et al. | |
| 2020/0082095 A1 | 3/2020 | McAllister et al. | |
| 2020/0380138 A1* | 12/2020 | Agarwal | G06F 21/57 |
| 2023/0319112 A1* | 10/2023 | Kaimal | H04L 63/20 726/1 |

FOREIGN PATENT DOCUMENTS

| | | | | |
|---|---|---|---|---|
| WO | WO-2018224243 A1 * | 12/2018 | | G06F 21/577 |
| WO | WO-2021173501 A1 * | 9/2021 | | G06Q 40/025 |

OTHER PUBLICATIONS

Alhebaishi et al., "Threat Modeling for Cloud Data Center Infrastructures," https://tsapps.nist.gov/publication/get_pdf.cfm?pub_id=921695, 17 pgs.

Dahle, T., "Large Scale Vulnerability Scanning," Masters Thesis, Spring, 2020, 84 pgs.

Hasan et al., "Toward a Threat Model for Storage Systems," StorageSS '05, people.cs.pitt.edu/~adamlee/pubs/2005/storagess05threat.pdf, Nov. 11, 2005, 9 pgs.

IBM, "IBM Proactive Support for IBM Storage Systems," IBM Canada Software Announcement, A19-0326, Apr. 23, 2019, https://www.ibm.com/downloads/cas/CA-ENUSA19-0326-CA, 8 pgs.

Mell et al., "The NIST Definition of Cloud Computing," Recommendations of the National Institute of Standards and Technology, U.S. Department of Commerce, Special Publication 800-145, Sep. 2011, 7 pgs.

Microsoft, "Threat Modeling," https://www.microsoft.com/en-us/securityengineering/sdl/threatmodeling, printed Feb. 17, 2022, 3 pgs.

Pure Storage, "Get the Pure AIOps Experience," https://www.purestorage.com/products/aiops/pure1.html, printed Feb. 17, 2022, 1 pg.

Rault, J. "The last S3 security document that we'll ever need, and how to use it," https://trustoncloud.com/the-last-s3-security-document-that-well-ever-need/, Aug. 19, 2021, 6 pgs.

Safecode, "Tactical Threat Modeling,"—https://safecode.org/wp-content/uploads/2017/05/SAFECode_TM_Whitepaper.pdf, 2017, 26 pgs.

Sutton et al., "Digitized Trust in Human-in-the-Loop Health Research." 2018 16th Annual Conference on Privacy, Security and Trust (PST), IEEE, 2018.

\* cited by examiner

| Type | Control | Testing | Effort | Feature Class(es) | Threat(s) and Impact | CVSS-weighted priority |
|---|---|---|---|---|---|---|
| Preventative Protect | Enable account-level Block Public Access on all storage accounts with BlockPublicAcls, IgnorePublicAcls, and RestrictPublicBuckets set to true. | 1) Create a public bucket and try to access one of its objects without proper authentication, or 2) change the ACL of an existing object to public, it should be denied | Very Low | FC10 FC5 FC8 | T4 (High) T14 (High) T36 (Very High) T37 (Very High) T38 (Medium) | Very High |
| Assurance Detect | Verify account-level Block Public Access is enabled on all storage accounts with BlockPublicAcls, IgnorePublicAcls, BlockPublicPolicy, and RestrictPublicBuckets set to be true. | Remove the account-level Block Public Access, it should be detected | Very Low | FC10 FC5 FC8 | - | Very High |
| Preventative Protect | Enable Block Public Access on all access points with BlockPublicAcls, IgnorePublicAcls, BlockPublicPolicy, and RestrictPublicBuckets set to true | 1)Create a public bucket and try to access via access point one of its objects without proper authentification, or 2) change the ACL of an existing object to public and try to access via access point one of its objects, it should be denied | Low | FC10 FC5 | T14 (High) T36 (Medium) T37 (Medium) T38 (Medium) | Very High |
| Assurance Detect | Verify Block Public Access is enabled on all bucks with BlockPublicAcls, IgnorePublicAcls, BlockPublicPolicy, and RestrictPublicBuckets set to true. | Remove Block Public Access of an access point, it should be detected | Medium | FC10 FC5 | - | Very High |

FIG. 2

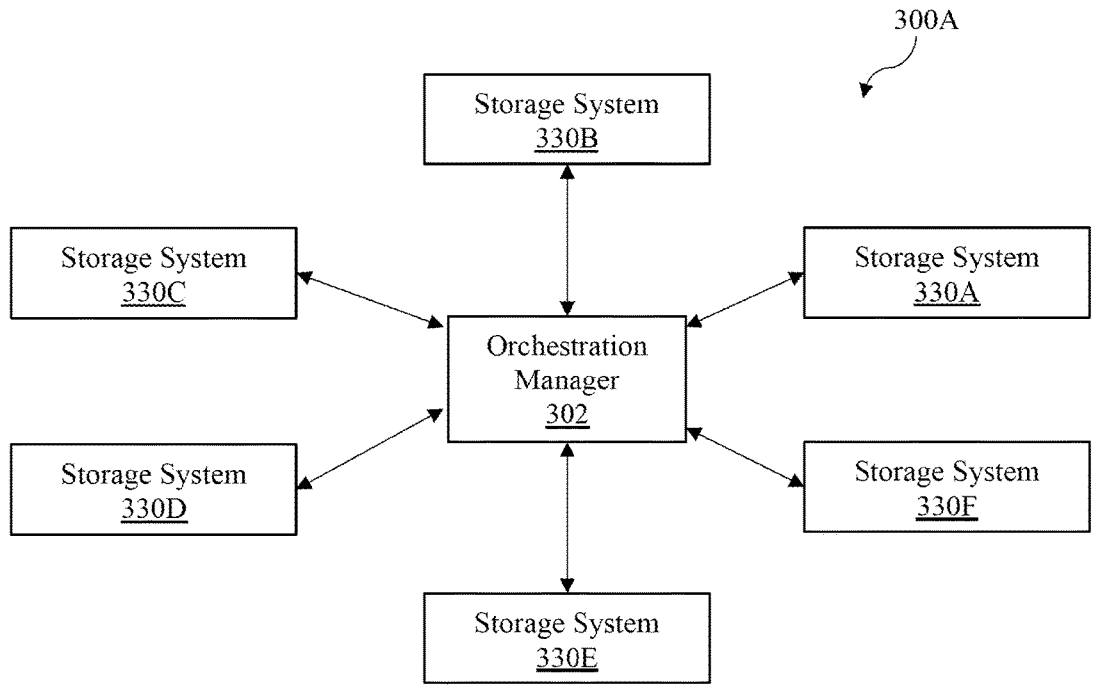

FIG. 3A

| Storage System | Priority Ranking | Description |
|---|---|---|
| 330A | Low | Workload matches with vendor threat model |
| 330B | High | Workload deviates from vendor threat model with high risk |
| 330C | Low | Workload matches with vendor threat model |
| 330D | Medium | Workload deviates from vendor threat model with medium risk |
| 330E | Low | Workload matches with vendor threat model |
| 330F | Critical | Workload deviates from vendor threat model with critical risk |

FIG. 3B

PREDICTIVE SERVICE ORCHESTRATION USING THREAT MODELING ANALYTICS

BACKGROUND

The present disclosure relates generally to the field of computer storage systems and, more specifically, to predictive service orchestration using threat modeling analytics.

Threat modeling for storage solutions typically occurs at the vendor site during design phase based on code review, pen testing, and other methods to reveal security vulnerabilities for a product (e.g., storage solution). Threat modeling is typically specific to a product, where the end user can deploy solutions based on different products that may interact in an un-tested manner exposing new security threats. Existing proactive service frameworks are built in a monolithic way where the manufacturer that ships a given storage unit/system can only analyse their system(s) and does not have insights about other storage unit manufacturers used by a prospective client in their computing environment. Existing proactive service frameworks focus on monitoring hardware failures and performance, but not security and dynamic threat analysis.

SUMMARY

Embodiments of the present disclosure include a computer-implemented method, system, and computer program product for predictive service orchestration using threat modeling analytics. A processor may identify a plurality of attributes of a client computing environment. The processor may collect threat modeling content for a plurality of vendor computing environments. The processor may analyze the threat modeling content for the plurality of vendor computing environments. The processor may compare the analyzed threat modeling content for the plurality of vendor computing environments with the plurality of attributes of the client computing environment. The processor may generate, based on the comparing, a client threat model for the client computing environment.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 2 illustrates an example vendor threat model, in accordance with some embodiments of the present disclosure.

FIG. 3A illustrates an example diagram of a client computing environment performing proactive container orchestration based on priority ranking, in accordance with some embodiments of the present disclosure.

FIG. 3B illustrates an example priority ranking table for a plurality of storage systems of a client computing system, in accordance with some embodiments of the present disclosure.

Figure 1:
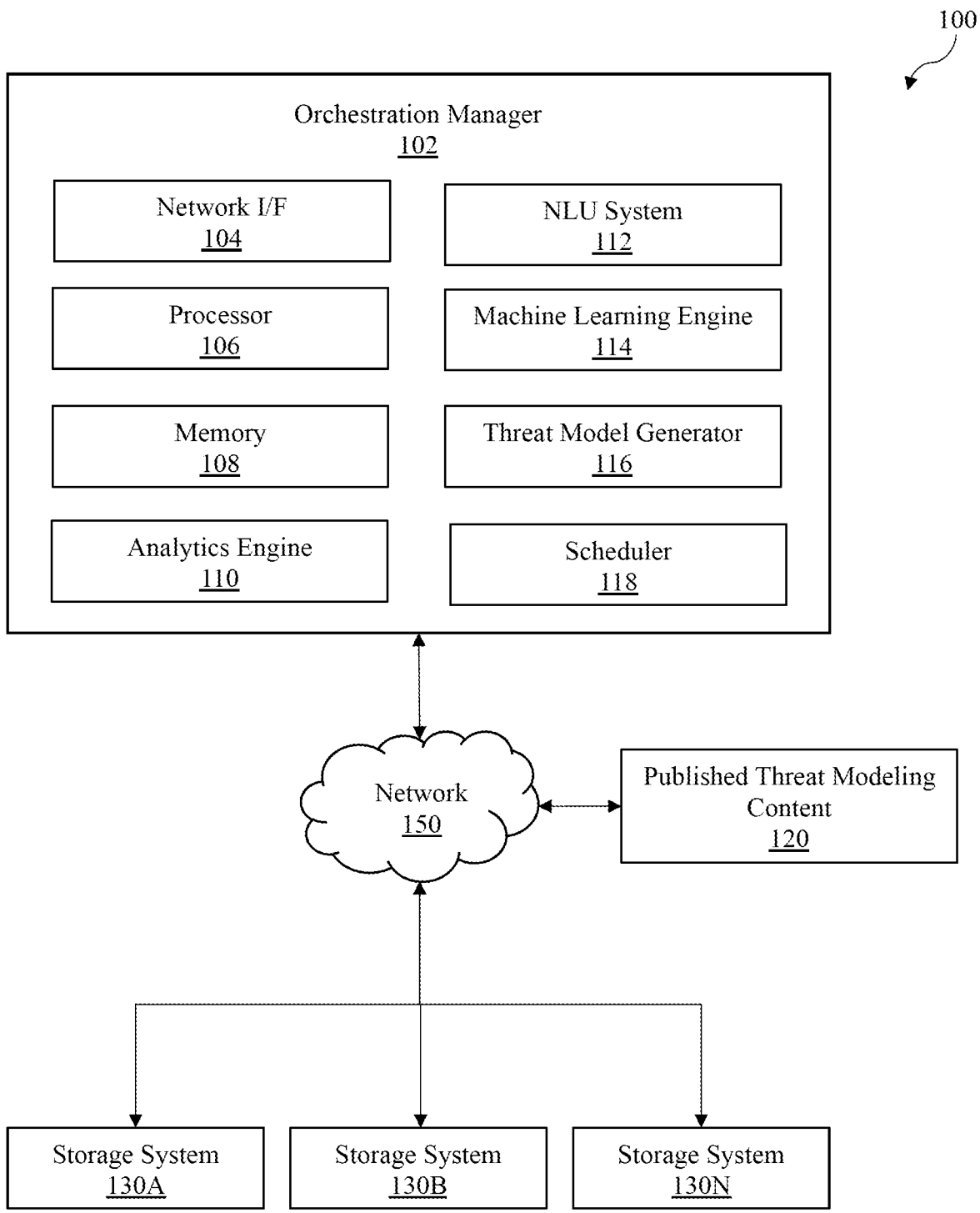
FIG. 1 illustrates an example client computing environment, in accordance with some embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of computer storage systems and, more particularly, to predictive service orchestration using threat modeling analytics. While the present disclosure is not necessarily limited to such applications, various aspects of the disclosure may be appreciated through a discussion of various examples using this context.

Containers are units of software in which the code and all its dependencies are packed, allowing applications to run quickly and efficiently from one computing environment to another. But as with any software, containers come with security risks. Container orchestration systems have their share of possible security vulnerabilities, which include external attacks, configuration issues, vulnerabilities within the applications, built-in flaws when containers are not designed with a security-first approach, image layers that are not verified, and user access and privileged accounts authentication issues. Furthermore, because containers have such short lifecycles, they are difficult to monitor as closely as one would other types of software or computing processes. The lack of close monitoring can result in malicious processes contaminating the orchestration environment.

Therefore, threat modeling is used to discover potential risks during the development and testing phases. In containers, threat modeling analysis finds data communication problems quickly, but it also lets developers add functionality to an application programming interface (API) for future development, eliminating the need for recoding. Threat modeling addresses those risks, making for a more secure computing environment.

However, existing and/or published threat modeling content for storage solutions typically occurs at the vendor site during design phase based on code review, pen testing, and other methods to reveal security vulnerabilities for a product. Threat modeling is typically specific to a product, where the end user can deploy solutions based on different products that may interact in an un-tested manner exposing new security threats. Existing proactive service frameworks are built in a monolithic way where the manufacturer that ships a given storage unit/system can only analyse their system(s) and does not have insights or threat modeling content about other storage units provided by a different manufacturer that is used by a prospective client in their computing framework/environment. Furthermore, existing proactive service frameworks focus on monitoring hardware failures and performance, but not security and dynamic threat analysis.

Embodiments of the present disclosure include a system, computer-implemented method, and computer program product that are configured for predictive service orchestration using threat modeling analytics. An orchestration manager may be used to analyze industry standard/published threat modeling content (e.g., vendor threat modeling reports related to a given storage solution or product) and generate a threat model that is specific to the user's or client's computing environment. The orchestration manager can determine a ranking or confidence level relative to the published threat modeling content. If a container workload on the client's computing environment is substantially similar to the known workloads of the published threat modeling content (e.g., where the risks and vulnerabilities of the various systems are known), then a scheduler may orchestrate the container setup and/or workload. If the container workload is not within a threshold value of the published threat modeling content, then the scheduler will not orchestrate the container workload unless an override policy is set and initiated by a user. In this way, the client computing environment may be adjusted to mitigate new threats/security risks that were not consider by the published threat models.

In embodiments, the system utilizes an orchestration manger to identify a plurality of attributes of a client computing environment. The attributes may include various components, configurations, workloads, and setups associated with the client computing environments. For example, the orchestration manager may detect and identify the components, configuration, and setup of each a first storage system and a second storage system that are utilized in the client computing environment, where the first storage system is manufactured by a first manufacturer and the second storage system is manufactured by a second manufacturer, the first and second manufacturer being different. The orchestration manager may identify the attributes of the client computing environment by running a given manufacturer's published commands or application programming interfaces (APIs). The orchestration manager may use the identified attributes to determine how products from different vendors interact with each other and/or determine how the products are deployed on the client computing environment.

In embodiments, the orchestration manager may further identify how current workloads affect the characteristics of the client computing environment. For example, the orchestration manager may determine how the workloads affect security, access control lists (ACLs), firewalls, sudo commands, keys, and resource availability for each user and/or application associated with the workflow that is deployed on the client computing environment.

In embodiments, the orchestration manager may collect threat modeling content for a plurality of vendor computing environments (e.g., storage solutions, storage system, and the like). For example, the orchestration manager may collect/obtain published threat models from each manufacturer of a given storage system/solution (e.g., IBM Total Storage®, Amazon S3®, Dell EMC®, Pure Storage®, Microsoft Azure®, Hewlett Packard Enterprise®, and the like) that is included in the client computing environment.

The threat modeling content may comprise published workloads, vulnerabilities, and use cases that have been tested and supported on the given manufacturers storage system that has been analyzed during security testing.

In embodiments, the orchestration manager may analyze the threat modeling content for the plurality of vendor computing environments. The orchestration manager may utilize various machine learning algorithms and/or natural language understanding to analyze the content of the threat modeling content collected for the plurality of vendor environments. In some embodiments, the orchestration manager may configure the client computing environment according to the known vulnerabilities and/or test cases collected from the threat modeling content. For example, the orchestration manager may configure a first storage system and a second storage system according to threat modeling content obtained from a first vendor and second vendor, respectively. In this way, the client computing environment is configured according to the published threat models. However, because the client computing environment may be set up according to client needs, various attributes (e.g., configurations, components, and or workloads) may not be the same as to what was tested for each storage system on an individual basis by the vendor/manufacturer.

In embodiments, the orchestration manager may compare the analyzed threat modeling content for the plurality of vendor computing environments with the plurality of attributes of the client computing environment. For example, the orchestration manager may compare the client solutions and/or workloads with the test cases from the collected threat modeling content. The orchestration manager my identify security test gaps (e.g., security threats not tested by the vendor(s)). For example, the security test gaps may be determined by analyzing differences in the client computing environment's framework, such as identifying and/or detecting where different combinations of components, systems, configurations, etc., are used within the client computing environment to solve unique problems that were not captured in the threat modeling content collected from the given vendor.

In embodiments, based on the comparison of the collected threat modeling content and the attributes of the client computing environment, the orchestration manager may generate a client threat model for the client computing environment. For example, the orchestration manager may generate the client threat model using a risk matrix for the client computing environment as a whole in relation with the workload/use cases, which may utilize individual aspects of a given threat model obtained for each individual storage system/solution from a given vendor. The client threat model may be generated using decision algorithms and/or coding.

In embodiments, the orchestration manager may generate a ranking value for the client threat model, wherein the ranking value is based in part on a confidence level or deviation between the client threat model and the threat modeling content for the plurality of vendor computing environments. The ranking value may be any type of value (e.g., range, percentage, score, etc.). For example, the generated client threat model may be given a value of 85% based on how similar it is to the published threat modeling content.

In embodiments, the orchestration manager may compare the ranking value of the client threat model to an orchestration threshold. The orchestration threshold may be set automatically, based on historical data for orchestration containers related to various storage systems, or set manually by the client.

In embodiments, the orchestration manager may orchestrate, in response to the orchestration threshold being met, at least one container of the client computing environment based on the client threat model. When the orchestration threshold is met or exceeded, this indicates that the client threat model is substantially similar to the published threat modeling content. Therefore, the security risks and/or vulnerabilities of the system may be minimal and container orchestration can take place with limited risk. For example, if the container workload on the client computing environment is substantially similar to known/published threat models, the orchestration manager my orchestrate the container setup/workload, and an operator may tune proactive server agents (e.g., callhome) to delay data collection processes since the risk are known. For example, if the ranking value of the client threat model is 80% and the orchestration threshold is set at 75%, the orchestration manager will automatically orchestrate the containers of the client computing environment. However, if ranking value of the client threat model does not meet the orchestration threshold, this indicates that there may be significant security/vulnerability risks throughout the system and that changes to one or more attributes (e.g., configurations, workloads, setups, etc.) of the client computing environment may need to be implemented.

In embodiments, in response to the orchestration threshold not being met, the orchestration manager may identify at least one security threat associated with the client computing environment based on the client threat model. For example, the at least one security threat may be determined from the identification of the security gaps and/or differences between the client threat model and the published threat modeling content. In some embodiments, the security threats may be detected using a probe that is introduced to a container and determines deviation of the workload from the standard workload from the published threat modeling content. The orchestration manager may generate a vulnerability score for the at least one security threat associated with client computing environment. For example, for any given security threat, the orchestration manager will generate a vulnerability score based on security risk (e.g., severity, exploitation, feasibility and/or likelihood of occurrence, etc.) in relation to the client computing environment.

In embodiments, the orchestration managers will compare the vulnerability score for the at least one security threat to a vulnerability threshold. The vulnerability threshold may be automatically determined using historical orchestration data in relation to historic security threats, or it may be manually set by the user. The vulnerability threshold is configured to gauge how severe or risky the at least one security threat is in relation to the client computing environment.

In embodiments, the orchestration manager may implement a security test for the at least one security threat in response to the vulnerability score meeting the vulnerability threshold. For example, a security threat with a low score that does not meet the vulnerability threshold may be considered as low risk and either be treated as an accepted risk or can have an automated test case run to cover the security gap when the system workload is low. Alternatively, if the security threat has a high vulnerability score that meets the threshold, an automated security test may be run and, based on the result, the orchestration manager may increase threat resources to reduce severity of the at least one security threat. For example, if the container workload does not match with the known/published threat model (the risks are unknown), then the scheduler does not orchestrate it unless an override policy is set. In this case, the scheduler orchestrates the container workload based on the score that and enables the callhome or proactive service agents to expedite the data collection process and collect more security data. In this way, the orchestration manager provides faster proactive services with minimal data collection (the data collection is minimized based on the threat model) and optimizes service mesh resources which effectively improves customer experiences in a hybrid cloud environment.

In embodiments, the orchestration manager may continually monitor changes to at least one attribute of the plurality of attributes of the client computing environment by a user. For example, the orchestration manager may monitor and log system events, analyze events and workload changes in order to predict further security threats. In some embodiments, the orchestration manager may dynamically adjust system resources consumed by threat modeling pro-active service to remain under a pre-defined threshold. This may be done to ensure that applications have enough resources to remain secure.

In embodiments, the orchestration manager may re-evaluate, based on the changes to at least one attribute, the client threat model. For example, the orchestration manager may re-run a threat analysis if changes to the setup, workload, configuration, etc., of the client computing environment occur. For example, if security threats are mitigated based on various security tests being run, the client threat model may increase its ranking value when compared to the orchestration threshold. In this way, the orchestration manager may implement orchestration of containers of the client computing environment if additional security measures have been implemented for a client threat model with a low ranking value.

In embodiments, the orchestration manager may share the client threat model with at least one vendor. For example, when new vulnerabilities and/or security threats are determined by the orchestration manger, sharing the client threat model with a given vendor may allow the vendor to address the vulnerabilities and/or security threats in their storage solutions/products.

The aforementioned advantages are example advantages, and not all advantages are discussed. Furthermore, embodiments of the present disclosure can exist that contain all, some, or none of the aforementioned advantages while remaining within the spirit and scope of the present disclosure.

With reference now to FIG. 1, shown is a block diagram of an example client computing environment 100 in which illustrative embodiments of the present disclosure may be implemented. In the illustrated embodiment, the client computing environment 100 (or system) includes container orchestration manager 102 that is communicatively coupled to storage system 130A, storage system 130B, storage system 130N (collectively referred to as storage systems 130), and published threat modeling content 120 via network 150. In embodiments, container orchestration manager 102 and storage systems 130, may be configured as any type of computer system and may be substantially similar to computer system 501 of FIG. 5. In some embodiments, storage systems 130 may be configured as various vendor storage systems/units (e.g., IBM Total Storage®, Amazon S3®, Dell EMC®, Pure Storage®, Microsoft Azure®, Hewlett Packard Enterprise®, and the like). In embodiments, published threat modeling content 120 may be collected/accessed/stored on various vendor websites and associated with a given vendor storage system. In some embodiments, the storage systems 130 and published threat modeling content 120 may be local to the container orchestration manager 102 itself.

In embodiments, network 150 may be any type of communication network, such as a wireless network, edge computing network, a cloud computing network, or any combination thereof (e.g., hybrid cloud network/environment). Network 150 may be substantially similar to, or the same as, cloud computing environment 50 described in FIG. 6. Consistent with various embodiments, a cloud computing environment may include a network-based, distributed data processing system that provides one or more edge/network/cloud computing services. Further, a cloud computing environment may include many computers (e.g., hundreds or thousands of computers or more) disposed within one or more data centers and configured to share resources over network 150.

In some embodiments, network 150 can be implemented using any number of any suitable communications media. For example, the network may be a wide area network (WAN), a local area network (LAN), an internet, or an intranet. In certain embodiments, the various systems may be local to each other, and communicate via any appropriate local communication medium. For example, container orchestration manager 102 may communicate with storage systems 130 and published threat modeling content 120 using a WAN, one or more hardwire connections (e.g., an Ethernet cable), and/or wireless communication networks. In some embodiments, the various systems may be communicatively coupled using a combination of one or more networks and/or one or more local connections. For example, in some embodiments container orchestration manager 102 may communicate with storage systems 130 locally or through a hardwired connection, while communication between published threat modeling content 120 may be through a wireless communication network.

In embodiments, container orchestration manager 102 includes processor 106 and memory 108. The container orchestration manager 102 may be configured to communicate with storage systems 130 and published threat modeling content 120 through an internal or external network interface 104. The network interface 104 may be, e.g., a modem or a network interface card. The container orchestration manager 102 may be equipped with a display or monitor. Additionally, the container orchestration manager 102 may include optional input devices (e.g., a keyboard, mouse, scanner, or other input device), and/or any commercially available or custom software (e.g., browser software, communications software, server software, natural language processing/understanding software, search engine and/or web crawling software, filter modules for filtering content based upon predefined parameters, etc.).

In some embodiments, the container orchestration manager 102 may include analytics engine 110, natural language understanding (NLU) system 112, machine learning engine 114, threat model generator 116, and scheduler 118. The NLU system 112 may include a natural language processor. The natural language processor may include numerous subcomponents, such as a tokenizer, a part-of-speech (POS) tagger, a semantic relationship identifier, and a syntactic relationship identifier.

In embodiments, the analytics engine 110 is configured to analyze the configuration, setup, components, and workloads of the client computing environment 100. The analytics engine 110 may dynamically identify the products and/or components that are include in the client computing environment 100 (e.g., storage solution) to determine how the various components interact. For example, the analytics engine 110 may identify products from different vendors and make determinations how they interact and are deployed throughout the environments. The various combinations of storage systems 130 are not typically tested by vendors, rather only the manufactured individual storage system is tested using threat analysis. The analytics engine 110 may identify workloads that are or will be deployed on the various storage systems 130 of the client computing environments and how these workloads can effect security of the client computing environment. For example, the analytics engine 110 may utilize a probe to identify how workloads affect access control lists (ACLs), firewalls, account users, and/or resources available for each user application. The analytics engine 110 may perform detection/identification techniques by analyzing metadata associated with the storage systems 130 of the client computing environment and/or by analyzing associated unstructured data in coordination with NLU system 112.

In embodiments, analytics engine 110 may utilize NLU system 112 to analyze published threat modeling content collected from each vendor. A generic example of a vendor threat model is described in FIG. 2 below. The NLU system 112 may analyze the unstructured textual data of the vendor threat model to determine vulnerabilities of a given storage system. For example, the NLU system 112 may analyze various types, controls, testing, efforts, feature classes, threats/impacts, and weighted priority related to the threat model that was created during security testing of the given vendor storage system.

In embodiments, threat model generator 116 is configured to generate a client threat model from the analyzed published threat modeling content and the attributes of the client computing environment 100. Once generated, the analytics engine 110 may determine a ranking value for the client threat model. The ranking value may be based in part on a confidence level or deviation between the client threat model and the published threat modeling content.

In embodiments, scheduler 118 is configured to automatically orchestrate at least one container if the client threat model meets an orchestration threshold. When the orchestration threshold is met or exceeded, this indicates that the client threat model is substantially similar to the published threat modeling content and security risks are at an acceptable level. If the orchestration threshold is not met (indicating there are security risks associated with attributes of the client computing environment due to, for example, unknowns regarding the combination of components), the scheduler will not perform container orchestration unless there is an override policy. In embodiments, this allows the orchestration manager 102 to dynamically adjust system resources consumed by the threat modeling pro-active service that remain under a pre-defined threshold. This may be done to ensure that applications have enough resources to remain secure.

In some embodiments, the container orchestration manager 102 may use a machine learning engine 114 to improve its capabilities automatically through experience and/or repetition without procedural programming. For example, machine learning engine 114 may analyze the accuracy of the identifying new security risks by analyzing the generated client threat model in combination with feedback from the user (e.g., manual changes to attributes or workloads by the user to address the new security threats). The machine learning engine 114 may determine that ranking values/confidence values for the client threat model were incorrect based on analyzing user manipulation and may automatically increase/decrease confidence thresholds and/or adjust the specificity of confidence value determinations. In this way, the system may become more accurate in analyzing and generating adjusted client threat models initially without manual user adjustment.

Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBDT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

It is noted that FIG. 1 is intended to depict the representative major components of an exemplary client computing environment 100. In some embodiments, however, individual components may have greater or lesser complexity than as represented in FIG. 1, components other than or in addition to those shown in FIG. 1 may be present, and the number, type, and configuration of such components may vary.

For example, while FIG. 1 illustrates a client computing environment 100 with a single container orchestration manager 102, three storage systems 130, a single published threat modeling content 120, and a single network 150, suitable computing environments for implementing embodiments of this disclosure may include any number of client computing environments, container orchestration managers, storage systems, published threat modeling content, and networks. The various modules, systems, and components illustrated in FIG. 1 may exist, if at all, across a plurality of client computing environments, container orchestration managers, storage systems, published threat modeling contents, and networks.

Referring now to FIG. 2, shown is an example vendor threat model 200, in accordance with some embodiments of the present disclosure. The vendor threat model 200 is a generic representation of a published threat model for a storage system/solution that may be collected by orchestration manager 102 from a vendor. In the illustrated embodiment, the vendor threat model 200 includes columns for type, control, testing, effort, feature classes, threat and impact, and common vulnerability scoring system (CVSS) weighted priority. In embodiments, the orchestration manager 102 may analyze the vendor threat model 200 in relation to a given storage system (one of storage systems 130) that has been implemented in the client computing environment 100. Using the analyzed vendor threat model 200, the orchestration manager 102 may identify various security threats associated with the client computing environment 100.

Referring now to FIG. 3A, shown is an example diagram of a client computing environment 300A for performing proactive container orchestration based on priority ranking, in accordance with some embodiments of the present disclosure. In the illustrated embodiment, client computing environment 300A comprises orchestration manager 302 that is communicatively connected to storage systems 330A-330F. In embodiments, each of the storage systems 330A-330F are manufactured by a different vendor and each include a vendor specific published threat model that is collected and analyzed by the orchestration manager 302. Using the vendor specific threat models, the orchestration manager can generate a client threat model for the client computing environment 300A. The client threat model comprises a holistic threat analysis of the client computing environment 300A. The client threat model may be used to identify where security gaps/threats exists in the client computing environment 300A by comparison to the published vendor specific threat models. The orchestration manager 302 may prioritize resources to mitigate the security gaps/threats for each specific storage system based on their ranking as indicated by table 300B of FIG. 3B.

Referring now to FIG. 3B, shown is an example priority ranking table 300B for a plurality of storage systems 330A-330F of a client computing system 300A. In embodiments, the priority ranking may be associated with a ranking value, however, for simplicity purposes, only the terms low, medium, high, and critical are used in the table 300B. In the illustrated embodiments, storage system 330A, 330C, and 330E have a low priority ranking. A low priority ranking indicates that the given workload on the storage system is substantially similar to the published threat model. In embodiments, the orchestration manager 302 may automatically orchestrate containers on storage systems with low priority rankings since there is limited security risks.

In the illustrated embodiment, storage system 330B has a high priority ranking indicating that the workload on the storage system deviates from the published threat model with high risk. Storage system 330D has a medium priority ranking indicating that the workload on the storage system deviates from the published threat model with medium risk. Storage system 330F has a critical priority ranking indicating that the workload on the storage system deviates from the published threat model with critical risk. In embodiments, the orchestration manager 302 may implement various security testing for a high risk/critical ranking and dynamically adjust system resources consumed by threat modeling pro-active service that remain under a pre-defined threshold. Various thresholds for medium risk may be adjusted dependent on the clients risk tolerance.

Figure 4A:
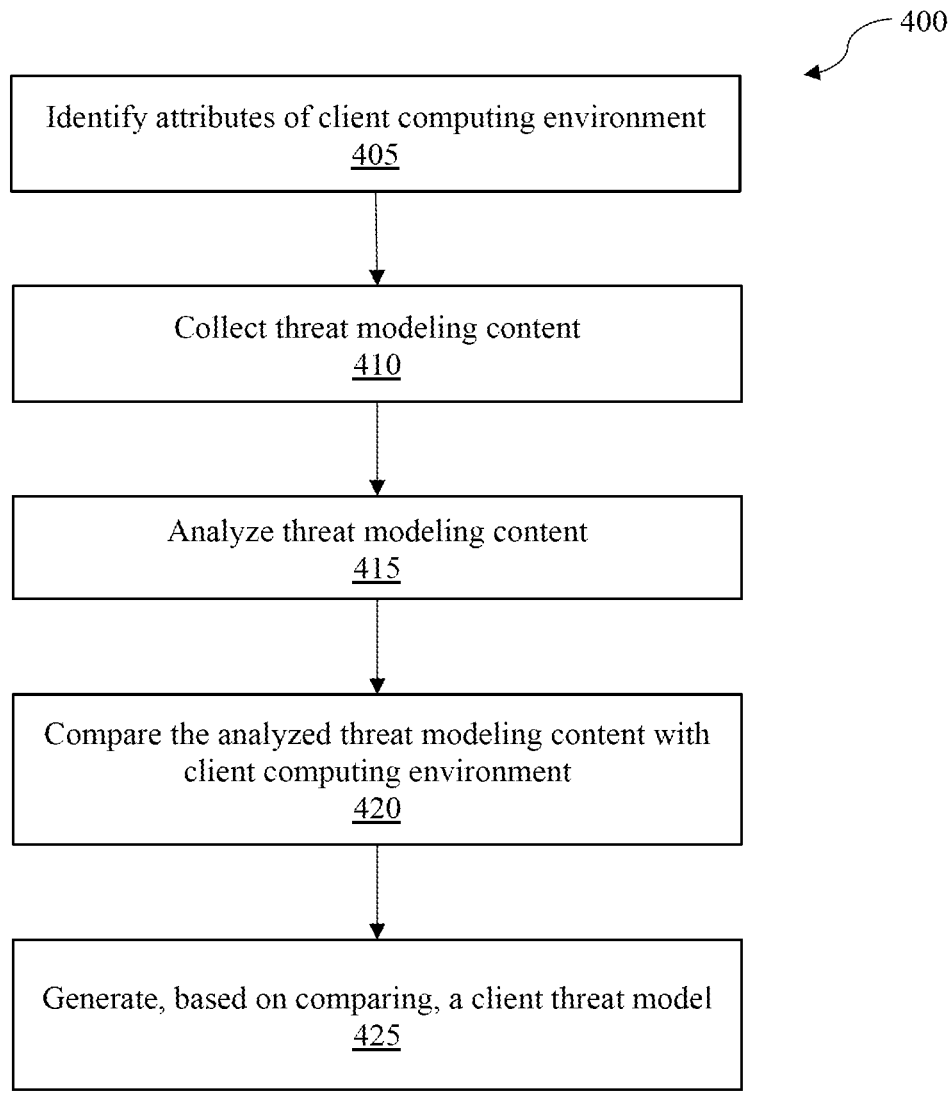
FIG. 4A illustrates an example process for predictive service orchestration using threat modeling analytics, in accordance with some embodiments of the present disclosure.

Referring now to FIG. 4A, shown is an example process 400 for predictive service orchestration using threat modeling analytics, in accordance with some embodiments of the present disclosure. The process 400 may be performed by processing logic that comprises hardware (e.g., circuitry, dedicated logic, programmable logic, microcode, etc.), software (e.g., instructions run on a processor), firmware, or a combination thereof. In some embodiments, the process 400 is a computer-implemented process. In embodiments, the process 400 may be performed by processor 106 of container orchestration manager 102 exemplified in FIG. 1.

The process 400 begins by identifying a plurality of attributes of a client computing environment. This is illustrated at step 405. The attributes may include various components, configurations, workloads, and setups associated with the client computing environment. For example, the orchestration manager (e.g., orchestration manager 102) may detect and identify the components, configuration, workload, and setup of each a first storage system and a second storage system that are utilized in the client computing environment. The first storage system may be manufactured by a first vendor or manufacturer and the second storage system may be manufactured by a second vendor or manufacturer, where the first and second vendor are different. In embodiments, the orchestration manager may identify the attributes of the client computing environment by running a given manufacturers published commands or APIs. The orchestration manager may use the identified attributes to determine how products/solutions from different vendors interact with each other and/or determine how the products are deployed on the client computing environment.

The process 400 continues by collecting threat modeling content for a plurality of vendor computing environments. This is illustrated at step 410. The plurality of vendor computing environments may be configured as any type of storage solution or storage system. For example, the vendor computing environments may be various commercially available storage solutions, such as IBM Total Storage®, Amazon S3®, Dell EMC®, Pure Storage®, Microsoft Azure®, Hewlett Packard Enterprise®, and the like.

The threat modeling content may comprise individual threat models for each vendor computing environment (or storage system). The threat modeling content may comprise published workloads, vulnerabilities, and use cases that have been tested and supported on the given manufacturers storage system that has been analyzed during security testing.

The process 400 continues by analyzing the threat modeling content for the plurality of vendor computing environments. This is illustrated at step 415. For example, the orchestration manager may utilize various machine learning algorithms and/or natural language understanding to analyze the content of the threat modeling content collected for the plurality of vendor environments. In some embodiments, the orchestration manager may configure the client computing environment according to the known vulnerabilities and/or test cases collected from the threat modeling content. For example, the orchestration manager may configure a first storage system and a second storage system according to threat modeling content obtained from a first vendor and second vendor, respectively. In this way, the client computing environment is configured according to the published threat models. However, because the client computing environment may be set up according to client needs, various attributes (e.g., configurations, components, and or workloads) may not be the same as to what was tested for each storage system on an individual basis by the vendor/manufacturer.

The process 400 continues by comparing the analyzed threat modeling content for the plurality of vendor computing environments with the plurality of attributes of the client computing environment. This is illustrated at step 420. For example, the orchestration manager may compare the client solutions and/or workloads with the test cases from the collected threat modeling content. The orchestration manager my identify security test gaps (e.g., security threats not tested by the vendor(s)). For example, the security test gaps may be determined by analyzing difference in the client computing environment's framework, such as identifying and/or detecting where different combinations of components, systems, configurations, etc., are used with the client computing environment to solve unique problems that were not captured in the threat modeling content collected from the given vendor.

The process 400 continues by generating, based on the comparing, a client threat model for the client computing environment. This is illustrated at step 425. For example, the orchestration manager may generate the client threat model using a risk matrix for the client computing environment as a whole in relation with the workload/use cases, which may utilize individual aspects of a given published threat model obtained for each individual storage system/solution from a given vendor.

Figure 4B:
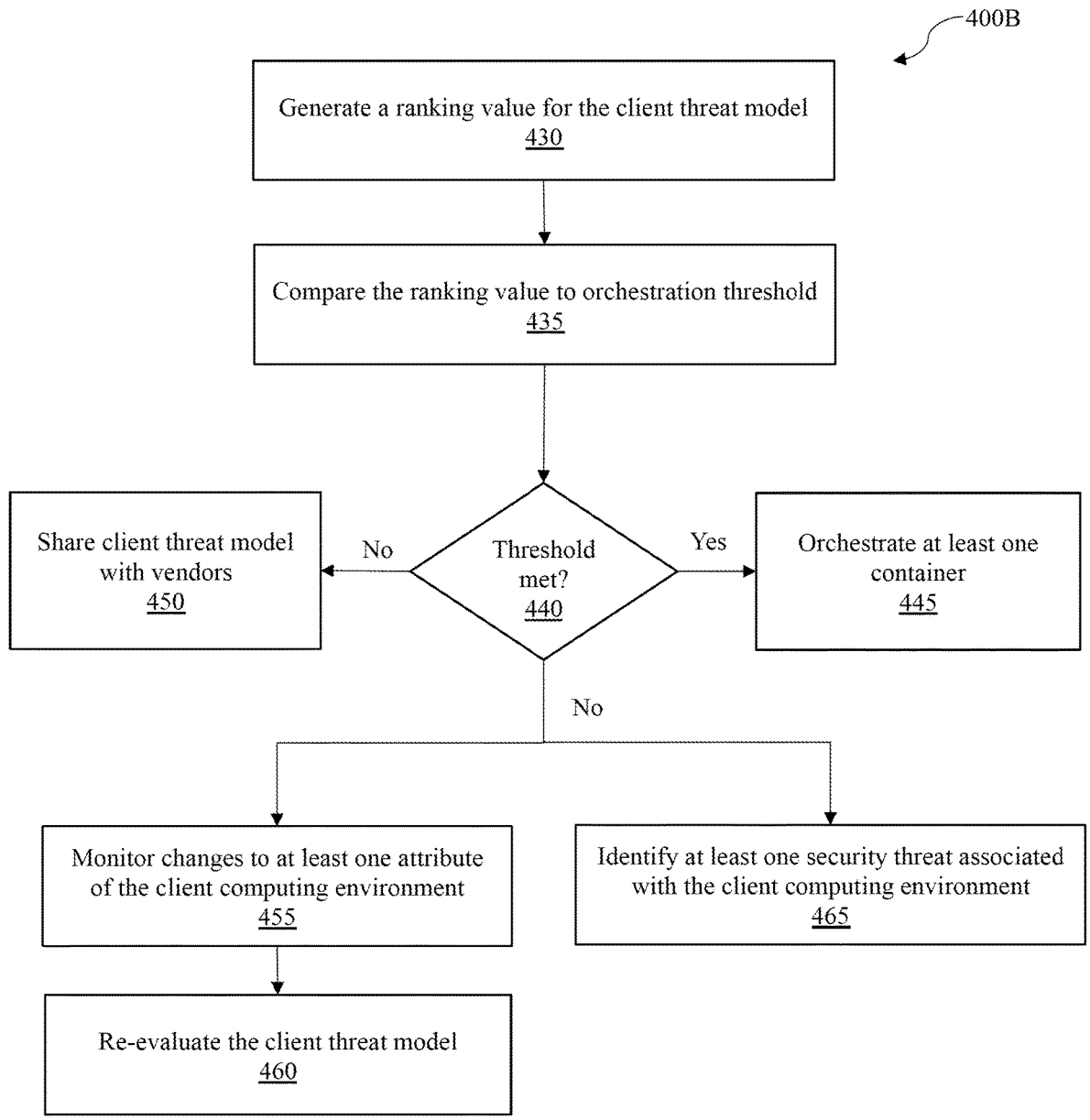
FIG. 4B illustrates a subprocess of the example process of FIG. 4A for predictive service orchestration using threat modeling analytics, in accordance with some embodiments of the present disclosure.

In some embodiments, the process 400 continues to step 430 as described in FIG. 4B. Referring now to FIG. 4B, shown is process 400B which may be in addition to or a subprocess of the example process 400 of FIG. 4A, in accordance with some embodiments of the present disclosure. The process 400B may be performed by processing logic that comprises hardware (e.g., circuitry, dedicated logic, programmable logic, microcode, etc.), software (e.g., instructions run on a processor), firmware, or a combination thereof. In some embodiments, the process 400B is a computer-implemented process. In embodiments, the process 400B may be performed by processor 106 of container orchestration manager 102 exemplified in FIG. 1.

Process 400B begins by generating a ranking value for the client threat model. This is illustrated at step 430. In embodiments, the ranking value is based in part on a confidence level or deviation between the client threat model and the threat modeling content for the plurality of vendor computing environments. The ranking value may be any type of value (e.g., range, percentage, score, etc.).

The process 400B continues by comparing the ranking value to an orchestration threshold. This is illustrated at step 435. In some embodiments, the orchestration threshold may be set automatically by the orchestration manager, based on historical data for orchestration containers related to known storage systems, or set manually by the client or user.

If the orchestration threshold is met, "Yes" at step 440, then the process 400B continues by orchestrating at least one container of the client computing environment based on the client threat model. This is illustrated at step 445. When the orchestration threshold is met or exceeded, this indicates that the client threat model is substantially similar to the published threat modeling content. Therefore, the security risks and/or vulnerabilities of the system may be minimal and container orchestration can take place with limited risk. For example, if the ranking value of the client threat model is 80% and the orchestration threshold is set at 75%, the orchestration manager will automatically orchestrate the containers of the client computing environment.

In some embodiments, if the orchestration threshold is not met, "No" at step 440, then the process 400B continues by sharing the client threat model with at least one vendor. This is illustrated at step 450. For example, if ranking value of the client threat model does not meet the orchestration threshold, this indicates that there may be significant security/vulnerability risks throughout the system and that changes to one or more attributes (e.g., configurations, workloads, setups, etc.) of the client computing environment may need to be implemented. In this way, when new vulnerabilities and/or security threats are determined by the orchestration manger, sharing the client threat model with a given vendor may allow the vendor to address the vulnerabilities and/or security threats in their storage solutions/products.

In some embodiments, if the orchestration threshold is not met, "No" at step 440, then the process 400B continues by monitoring changes to at least one attribute of the plurality of attributes of the client computing environment by a user. This is illustrated at 455. For example, the orchestration manager may monitor and log system events, analyze events and workload changes in order to predict further security threats. In some embodiments, the orchestration manager may dynamically adjust system resources consumed by threat modeling pro-active service that remain under a pre-defined threshold. This may be done to ensure that applications have enough resources to remain secure.

In some embodiments, a user may manually initiate orchestration of at least one container of the client computing environment once changes to attributes are implemented to mitigate security risks. This may also be based on a user override policy.

In some embodiments, the process 400B continues by re-evaluating, based on the changes to at least one attribute, the client threat model. This is illustrated at step 460. In embodiments, once the change to the attribute(s) is made, then the orchestration manager may generate a second ranking value for the client threat model. The second ranking value may be compared to the orchestration threshold and if the threshold is now met, orchestration of at least one container of the client computing environment may occur based on the re-evaluation of the threat model.

In some embodiments, if the orchestration threshold is not met, "No" at step 440, then the process 400B continues by identifying at least one security threat associated with the client computing environment based on the client threat model. This is illustrated at step 465. For example, the at least one security threat may be determined from the identification of the security gaps and/or differences between the client threat model and the published threat modeling content. The orchestration manager may generate a vulnerability score for the at least one security threat associated with client computing environment. For example, for any given security threat, the orchestration manager will generate a vulnerability score based on security risk (e.g., severity, exploitation, feasibility and/or likelihood of occurrence, etc.) in relation to the client computing environment.

In embodiments, the orchestration managers will compare the vulnerability score for the at least one security threat to a vulnerability threshold. The vulnerability threshold may be automatically determine using historical orchestration data in relation to historic security threats, or may be manually set by the user. The vulnerability threshold is configured to gauge how severe or risky the security threat for the client computing environment.

Figure 5:
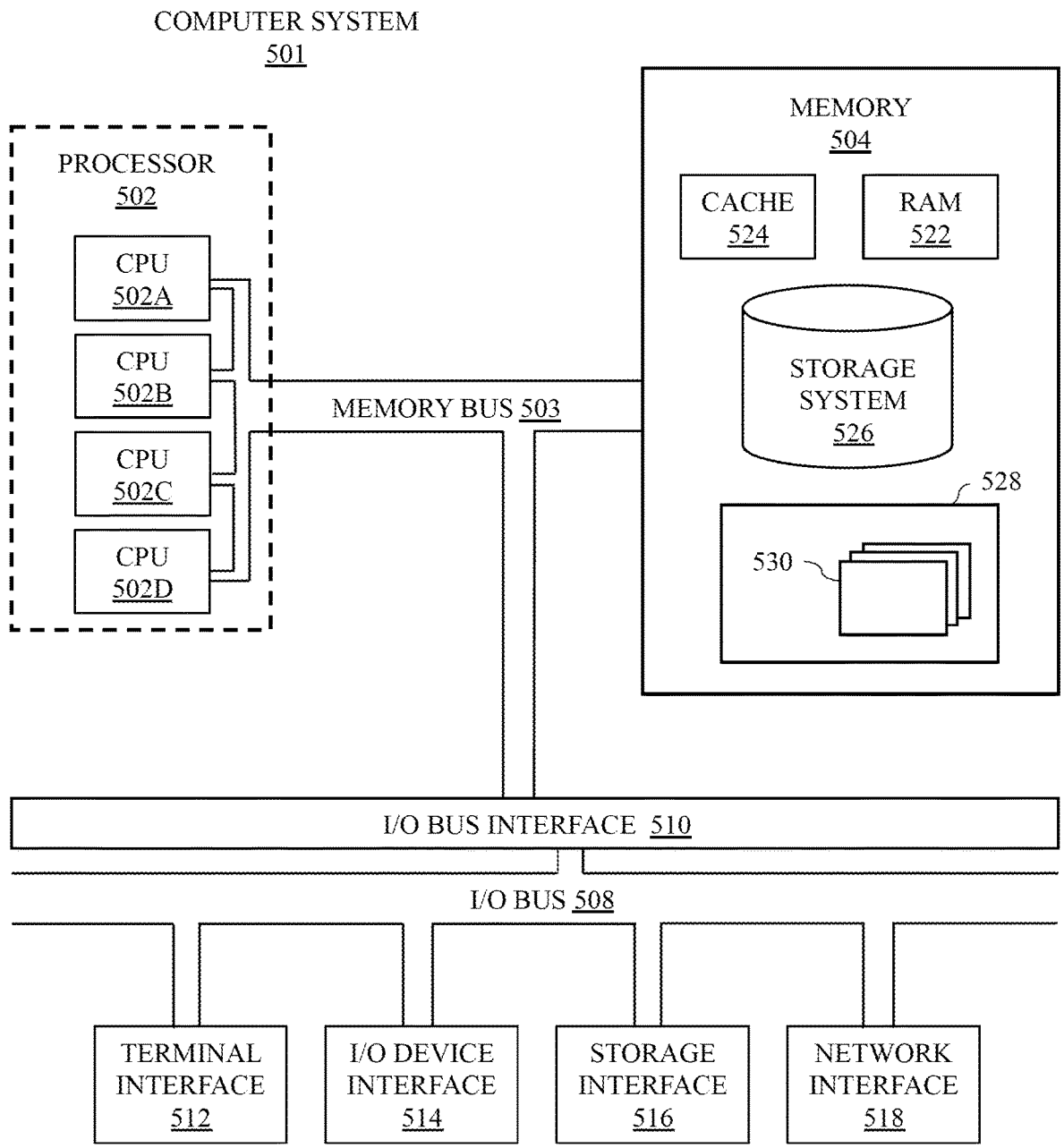
FIG. 5 illustrates a high-level block diagram of an example computer system that may be used in implementing one or more of the methods, tools, and modules, and any related functions, described herein, in accordance with embodiments of the present disclosure.

In embodiments, the orchestration manager may implement a security test for the at least one security threat in response to the vulnerability score meeting the vulnerability threshold. For example, a security threat with a low score that does not meet the vulnerability threshold may be considered as low risk and either be treated as an accepted risk or can have an automated test case run to cover the security gap when the system workload is low. Alternatively, if the security has a high vulnerability score that meets the threshold, an automated security test may be run and based on the result, the orchestration manager may increase threat resources to reduce severity of the at least one security threat. increasing, based on the security test, threat resources to reduce severity of the at least one security threat Referring now to FIG. 5, shown is a high-level block diagram of an example computer system 501 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, a storage interface 516, an I/O (Input/Output) device interface 514, and a network interface 518, all of which may be communicatively coupled, directly or indirectly, for inter-component communication via a memory bus 503, an I/O bus 508, and an I/O bus interface 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache. In some embodiments, a processor can include at least one or more of, a memory controller, and/or storage controller. In some embodiments, the CPU can execute the processes included herein (e.g., process 400 as described in FIG. 4A and FIG. 4B). In some embodiments, the computer system 501 may be configured as client computing environment 100 of FIG. 1.

System memory subsystem 504 may include computer system readable media in the form of volatile memory, such as random-access memory (RAM) 522 or cache memory 524. Computer system 501 may further include other removable/non-removable, volatile/non-volatile computer system data storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory subsystem 504 can include flash memory, e.g., a flash memory stick drive or a flash drive. Memory devices can be connected to memory bus 503 by one or more data media interfaces. The memory subsystem 504 may include at least one program product having a set (e.g., at least one) of program modules that are configured to carry out the functions of various embodiments.

Although the memory bus 503 is shown in FIG. 5 as a single bus structure providing a direct communication path among the CPUs 502, the memory subsystem 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single units, the computer system 501 may, in some embodiments, contain multiple I/O bus interfaces 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

One or more programs/utilities 528, each having at least one set of program modules 530 may be stored in memory subsystem 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs/utilities 528 and/or program modules 530 generally perform the functions or methodologies of various embodiments.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various search servers through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
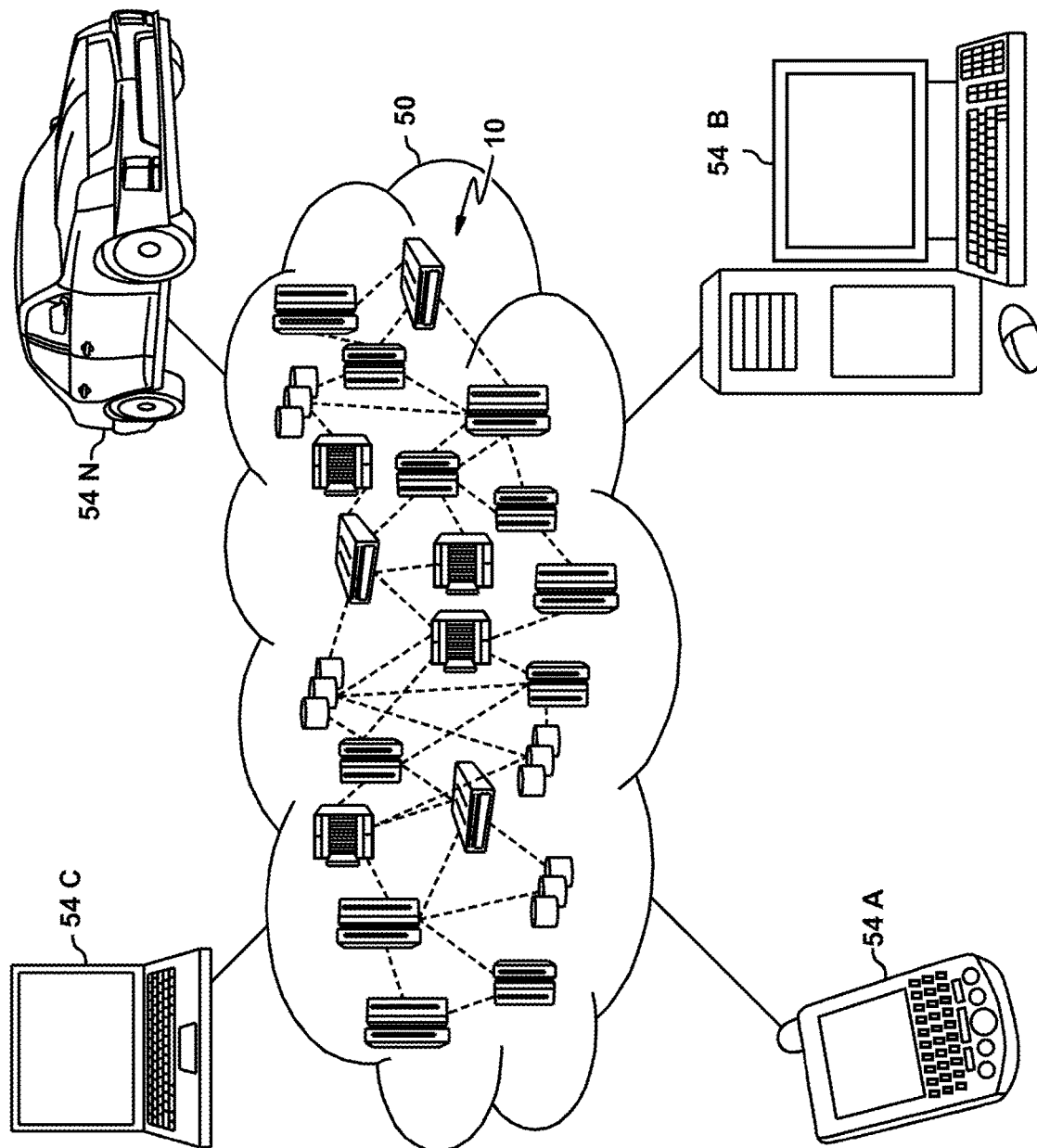
FIG. 6 depicts a cloud computing environment in accordance with embodiments of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
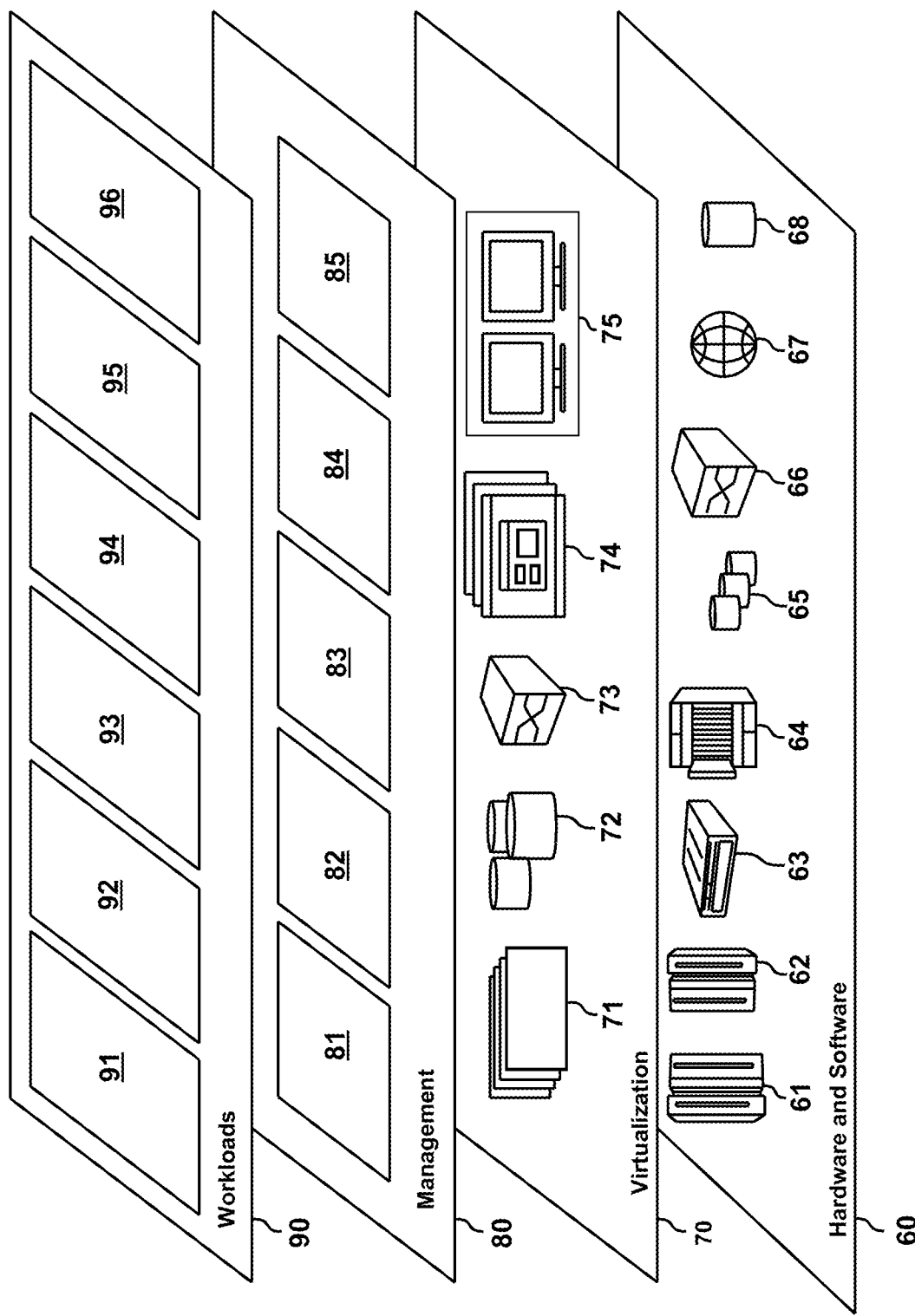
FIG. 7 depicts abstraction model layers in accordance with embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and container orchestration management software 68 in relation to the client computing environment 100 of FIG. 1.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and orchestration manager processing 96. For example, client computing environment 100 of FIG. 1 may be configured to manage container orchestration and client threat model generation using workloads layer 90.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., 100*a*, 100*b*, 100*c*) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method comprising:
   causing, by a processor, a plurality of commands to be performed at a client computing environment having vendor storage systems, at least some of the vendor storage systems having different physical configurations than other ones of the vendor storage systems;
   identifying, by the processor, a plurality of attributes of the vendor storage systems of the client computing environment;
   collecting, by the processor over a network, threat modeling content relating to the plurality of commands performed on the vendor storage systems;
   analyzing, by the processor and using natural language processing, the threat modeling content to identify one or more vulnerabilities associated with one or more vendor storage systems of the vendor storage systems;
   comparing, by the processor, the analyzed threat modeling content with the plurality of attributes of the client computing environment;
   identifying, by the processor and based on the comparing, one or more security gaps associated with the client computing environment;
   generating, by the processor and based on the identifying, a client threat model for the client computing environment;
   generating, by the processor, a ranking value for the client threat model, wherein the ranking value is based in part on a confidence level between the client threat model and the threat modeling content;
   comparing, by the processor, the ranking value to an orchestration threshold;
   causing changes to be made to one or more of the plurality of attributes of the client computing environment in response to the ranking value not meeting the orchestration threshold;
   in response to the changes being made to the one or more attributes, re-evaluating the client threat model; and
   orchestrating, by the processor and in response to the ranking value meeting the orchestration threshold, at least one container of the client computing environment based on the client threat model.

2. The computer-implemented method of claim 1, further comprising:
   in response to the changes being made to the one or more attributes, dynamically adjusting, by an orchestration manager, system resources consumed by the client threat model under a pre-defined threshold.

3. The computer-implemented method of claim 2, further comprising:
   in response to the changes made to the one or more attributes causing a security threat to be mitigated, incrementing the ranking value.

4. The computer-implemented method of claim 2, further comprising, in response to re-evaluating, by the processor and based on the changes to at least one attribute, the client threat model:
   generating, by the processor, a second ranking value for the client threat model; comparing, by the processor, the second ranking value to the orchestration threshold; and
   orchestrating, by the processor and based on the orchestration threshold being met, at least one container of the client computing environment.

5. The computer-implemented method of claim 4, further comprising:
   increasing, by the processor and based on a security test, threat resources to reduce severity of at least one security threat.

6. The computer-implemented method of claim 1, further comprising:
   identifying, by the processor and in response to the ranking value not meeting the orchestration threshold, at least one security threat associated with the client computing environment based on the client threat model;
   generating, by the processor, a vulnerability score for the at least one security threat associated with client computing environment;
   comparing by the processor, the vulnerability score for the at least one security threat to a vulnerability threshold; and
   implementing, by the processor and in response to the vulnerability score meeting the vulnerability threshold, a security test for the at least one security threat.

7. The computer-implemented method of claim 1, further comprising:
   sharing, by the processor, the client threat model with at least one vendor.

8. The computer-implemented method of claim 1, wherein an attribute of the plurality of attributes of the client computing environment is selected from a group of attributes consisting of:
   component attributes;
   configuration attributes;
   workload attributes; and
   setup attributes.

9. The computer-implemented method of claim 1, wherein the threat modeling content includes workloads.

10. A system comprising:
a processor; and
a computer-readable storage medium communicatively coupled to the processor and storing program instructions which, when executed by the processor, cause the processor to perform a method comprising:
identifying a plurality of attributes of vendor storage systems of a client computing environment in response to a plurality of commands being performed at the client computing environment, wherein at least some of the vendor storage systems have different physical configurations than other ones of the vendor storage systems;
collecting, over a network, threat modeling content relating to the plurality of commands performed at the vendor storage systems;
analyzing, using natural language processing, the threat modeling content to identify one or more vulnerabilities associated with one or more vendor storage systems of the vendor storage systems;
identifying one or more security gaps associated with the client computing environment by comparing the analyzed threat modeling content with the plurality of attributes of the client computing environment;
generating, based on the identifying, a client threat model for the client computing environment;
generating, by the processor, a ranking value for the client threat model, wherein the ranking value is based in part on a confidence level between the client threat model and the threat modeling content;
comparing, by the processor, the ranking value to an orchestration threshold;
orchestrating, by the processor and in response to the ranking value meeting the orchestration threshold, at least one container of the client computing environment based on the client threat model;
causing changes to be made to one or more of the plurality of attributes of the client computing environment in response to the ranking value not meeting the orchestration threshold;
in response to the changes being made to the one or more attributes, re-evaluating the client threat model; and
in response to the changes made to the one or more attributes causing a security threat to be mitigated, incrementing the ranking value.

11. The system of claim 10, wherein the method performed by the processor further comprises:
identifying, in response to the ranking value not meeting the orchestration threshold, at least one security threat associated with the client computing environment based on the client threat model;
generating a vulnerability score for the at least one security threat associated with client computing environment;
comparing the vulnerability score for the at least one security threat to a vulnerability threshold; and
implementing, in response to the vulnerability score meeting the vulnerability threshold, a security test for the at least one security threat.

12. A computer program product comprising a computer-readable storage medium having program instructions embodied therewith, the program instructions executable by a processor to cause the processor to perform a method comprising:
identifying a plurality of attributes of vendor storage systems of a client computing environment in response to a plurality of commands being performed at the client computing environment, wherein at least some of the vendor storage systems have different physical configurations than other ones of the vendor storage systems;
collecting, over a network, threat modeling content relating to the plurality of commands performed at the vendor storage systems;
analyzing, using natural language processing, the threat modeling content to identify one or more vulnerabilities associated with one or more vendor storage systems of the vendor storage systems;
comparing the analyzed threat modeling content with the plurality of attributes of the client computing environment;
identifying, based on the comparing, one or more security gaps associated with the client computing environment;
generating, based on the identifying, a client threat model for the client computing environment;
generating, by the processor, a ranking value for the client threat model, wherein the ranking value is based in part on a confidence level between the client threat model and the threat modeling content;
comparing, by the processor, the ranking value to an orchestration threshold;
orchestrating, by the processor and in response to the orchestration threshold being met, at least one container of the client computing environment based on the client threat model;
causing changes to be made to the physical configuration of the client computing environment in response to the ranking value not meeting the orchestration threshold;
in response to the changes being made to the physical configuration, re-evaluating the client threat model;
dynamically adjusting, by an orchestration manager, system resources consumed by the client threat model under a pre-defined threshold based at least in part on the re-evaluating the client threat model; and
in response to the changes made to the physical configuration causing a security threat to be mitigated, incrementing the ranking value.

13. The computer program product of claim 12, wherein the method performed by the processor further comprises:
identifying, in response to the ranking value not meeting the orchestration threshold, at least one security threat associated with the client computing environment based on the client threat model;
generating a vulnerability score for the at least one security threat associated with client computing environment;
comparing the vulnerability score for the at least one security threat to a vulnerability threshold; and
implementing, in response to the vulnerability score meeting the vulnerability threshold, a security test for the at least one security threat.

14. The computer-implemented method of claim 1, wherein the causing changes to be made to one or more of the plurality of attributes of the client computing environment comprises:
causing one or more changes to be made to the physical configuration of the client computing environment.

15. The computer program product of claim 12, wherein the causing changes to be made to the physical configuration of the client computing environment includes changing a configuration of components in the client computing environment.

\* \* \* \* \*